Oct. 10, 1950 W. J. BROWN 2,524,760
PHASE SHIFT BRIDGE
Filed Aug. 28, 1947 3 Sheets-Sheet 1

INVENTOR.
Walter J. Brown
BY Woodling and Krost
attys.

Oct. 10, 1950 W. J. BROWN 2,524,760
PHASE SHIFT BRIDGE
Filed Aug. 28, 1947 3 Sheets-Sheet 2

INVENTOR.
Walter J. Brown
BY Woodling and Krost
attys

Patented Oct. 10, 1950

2,524,760

UNITED STATES PATENT OFFICE 2,524,760

PHASE SHIFT BRIDGE

Walter J. Brown, Cleveland Heights, Ohio

Application August 28, 1947, Serial No. 770,967

17 Claims. (Cl. 323—122)

My invention pertains in general to phase shifting bridges, and more particularly to sensitive phase shifting bridges that are capable of shifting the phase of the output voltage more than 180° relative to the input voltage.

Reference may be had to my copending applications entitled "Phase Shift System," "Phase Shift Network," and "Phase Shift Circuit," applications Serial Nos. 770,988, 770,966, and 779,909. This application is a parent application of my continuation-in-part application, Ser. No. 172,647, entitled "Motor Control Circuit," filed July 8, 1950.

An object of my invention is a phase shifting bridge whose output voltage is variable in phase by more than 180° relative to the input voltage while the magnitude of the output voltage remains substantially constant.

Another object of my invention is a phase shifting bridge containing reactive elements for establishing an output voltage which will have a large angle of phase shift relative to a reference voltage for a small change in the reactance of one of the elements.

Another object of my invention is a phase shifting bridge having two branch circuits across an alternating voltage source, each branch circuit containing a capacitive element and an inductive element, one branch circuit having a Q substantially twice as great as the Q of the other circuit and having reactances that are relatively variable.

Still another object of my invention is a phase shifting bridge having a capacitive element and an inductive element in each of two branch circuits energized from an alternating voltage source with one branch circuit having substantially twice the product of applied voltage and Q as the other circuit and having relatively variable reactance in the elements therein.

Another object of my invention is a phase shifting system for a grid controlled rectifier supplying rectified current to a direct current motor.

Another object of my invention is a phase modulator for incorporation into a phase modulated radio transmitter which modulator has two branch circuits each having inductive and capacitive elements, one of which is variable to produce a phase modulated carrier wave output.

Other objects and a fuller understanding of my invention may be had by referring to the following description and claims, taken in conjunction with the accompanying drawing, in which:

Figure 1:
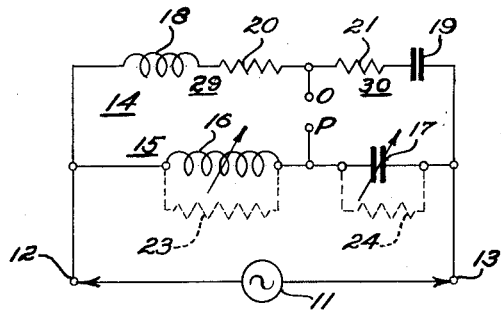
Figure 1 is a circuit diagram of a phase shifting bridge embodying my invention.

My invention pertains to phase shifting bridges for obtaining a wide angle of phase shift, and which is extremely sensitive yet capable of maintaining a substantially constant magnitude of output voltage. Figure 1 illustrates the preferred embodiment of my invention, wherein 11 designates an alternating voltage source having first and second terminals 12 and 13 respectively. First and second branch circuits 14 and 15 respectively are connected across the alternating voltage source 11. The first branch circuit 14 has an inductance or inductive element 18 and a capacitance or capacitive element 19, and first and second resistances 20 and 21 serially connected across the terminals 12 and 13 of the alternating voltage source 11. The first resistance 20 is associated with the inductance 18 to form a bridge arm 29 and the second resistance 21 is associated with the capacitance 19 to form a bridge arm 30. Disposed at the junction of the first and second resistances 20 and 21 is a first output terminal O of the phase shifting bridge. The second branch circuit 15 has an inductance or inductive element 16 and a capacitance or capacitive element 17, with a second output terminal P of the phase shifting bridge connected therebetween. Resistances 23 and 24, respectively, have been shown as an inherent property of the inductance and capacitance 16 and 17, which inductance and capacitance have also been shown as being variable.

Figure 4:
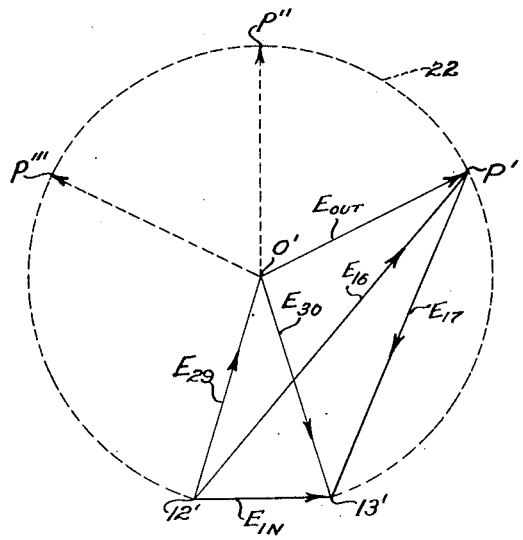
Figure 4 is a voltage vector diagram depicting the voltage vectors obtainable from the circuits of Figures 1, 2 and 3.

The vector diagram of Figure 4 may be referred to in the explanation of the operation of the circuit of Figure 1. $E_{in}$ is the input voltage developed in the alternating voltage source 11 across the terminals 12 and 13, and this vector $E_{in}$ has first and second ends respectively designated as 12' and 13'. The vectors $E_{29}$ and $E_{30}$ respectively represent the voltages or impedance drops obtained across the bridge arms 29 and 30. Likewise the vectors $E_{16}$ and $E_{17}$ represent the voltages obtained across the elements 16 and 17. The point O' and the point P' designate the potentials obtained at the output terminals O and P respectively. The output voltage, being obtained across the terminals O and P, is represented by the voltage vector $E_{out}$ that extends between the points O' and P'. The elements 16 and 17 have been shown as both being variable, but it is to be understood that either or both may be variable as long as the relative reactance of the two is variable. As the relative reactance of the elements 16 and 17 is varied, the point P' on the voltage vector diagram of Figure 4 will be caused to be moved on the arcuate locus 22, shown as a dotted arc in Figure 4, which spans the base line vector $E_{in}$. The locus 22 will be an arc of a circle if the angle 12'—P'—13' remains constant, which constancy can be maintained if the Q of the elements 16 and 17 are maintained constant while their relative reactance is being varied. This may be achieved by proper design of the particular element that is variable. Methods of keeping the Q substantially constant are known to those skilled in the art, and one such method is to employ a thermionic reactance tube as the variable reactance. The preferred form of reactance tube comprises a pentode or tetrode having a very high internal plate resistance such that the plate current is substantially independent of plate voltage. The pentode or tetrode is operated at constant screen voltage, and an alternating current feedback circuit is provided from plate to grid so as to establish an alternating current grid-cathode voltage which is substantially in quadrature with the alternating current plate-cathode voltage, and which is superimposed on a direct current negative grid-biasing voltage. The alternating current plate current is in phase with the alternating current grid-cathode voltage and is accordingly substantially in quadrature with the alternating current anode-cathode voltage. Accordingly, the tube exhibits the properties of a reactance having a Q which is dependent upon how nearly the phase angle of the alternating current feedback circuit approximates 90 degrees.

The magnitude of the reactance is varied by varying the mutual conductance of the tube by altering either the direct current negative grid bias or the direct current screen voltage. The phase angle of the reactance remains constant since it is equivalent to the phase angle of the alternating current feedback circuit which is not varied. The point O' has been judiciously placed at or close to the center of this arcuate locus 22, in order that the output voltage will remain substantially constant yet variable in phase over a wide angle. It will be noted that the triangle of vectors locating the locus of the point O' is an isosceles triangle, showing that the impedance voltage drops across the bridge arms 29 and 30 are equal in magnitude; if the resistive elements 20 and 21 are of equal resistance this corresponds to the condition of series resonance, in which the reactive voltages across the elements 18 and 19 are equal and opposite leaving only the resistive elements 20 and 21 to impede the flow of current. When the impedance drops of the two elements 16 and 17 are equal, the output voltage will be between the point O' and the point P''', and it will then be seen that the second branch circuit 15 is also substantially in series resonance in this condition. In this condition of substantial series resonance for the second branch circuit 15, the voltages across the elements 16 and 17 will be approximately twice as great as the voltages across the same type elements in the first branch circuit, namely the inductance and capacitance 18 and 19, respectively. In this particular condition of substantial series resonance for both branch circuits, it will easily be seen that the Q of the second branch circuit 15 is approximately twice as great as the Q of the first branch circuit 14. At the point P' or P''', although the respective reactive voltage drops have decreased, it will be seen that the Q of this first branch circuit has remained substantially constant, as long as the arcuate locus 22 in a true arc of a circle spanning the base line vector $E_{in}$. It will be seen that this phase shifting bridge is very sensitive, for approximately plus or minus 60° shift in the phase of the output voltage is obtainable by approximately plus or minus ten percent change in the relative reactance of the two elements, such as between the points P' and P'''. Much higher sensitivity can be obtained by using circuits of higher Q.

Figure 2:
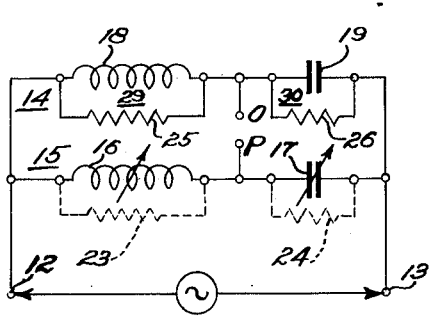
Figure 2 is a circuit diagram of a modification of my phase shifting bridge.

The Figure 2 depicts a slightly different modification of a circuit embodying my invention. In Figure 2, an alternating voltage source 11 having first and second terminals 12 and 13 energizes first and second branch circuits 14 and 15 respectively. The first branch circuit 14 again has an inductance 18 and a capacitance 19 serially connected with the output terminal O connected therebetween. A first and a second resistance 25 and 26 are connected in parallel across the inductance 18 and the capacitance 19 respectively to form bridge arms 29 and 30 respectively. The second branch circuit 15 has an inductance 16 and a capacitance 17 serially connected with said output terminal P connected therebetween. The elements 16 and 17 have been shown as being both variable, and each having an inherent resistance 23 and 24, respectively. The vector diagram of Figure 4 is as equally applicable to the circuit of Figure 2 as it was to the circuit of Figure 1. The resistances 23 and 24 have been shown as an inherent property of the elements 16 and 17, although it will be readily understood that these may be actual physical resistances, or a combination of actual and inherent resistance. In like manner, the resistances 20 and 21 could also be the inherent resistances of the elements, or a combination.

Figure 3:
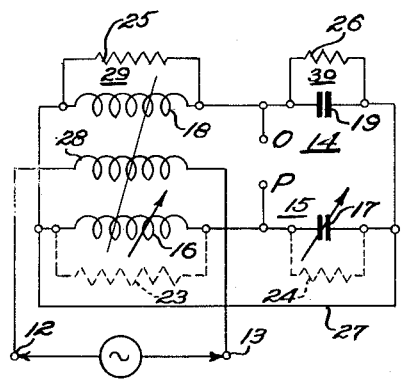
Figure 3 is a circuit diagram of a still further modification of my phase shifting bridge.
Figure 5:
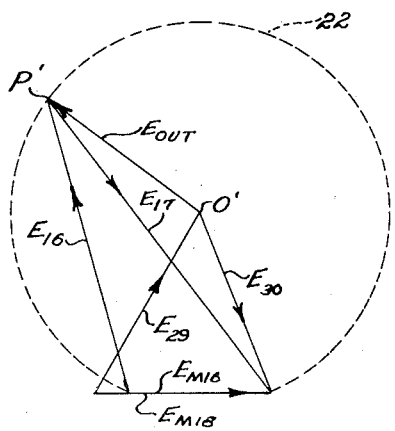
Figure 5 is a voltage vector diagram representing the voltages obtainable from the elements of the circuit of Figure 3.

The Figure 3 shows a still further modification of a circuit embodying my invention. An alternating voltage source having terminals 12 and 13 is connected to an inductive winding 28. The inductive winding 28 mutually induces a voltage into the two inductance elements 18 and 16 of the first and second branch circuits 14 and 15. An electrical connection means 27 is connected across the ends of the first and second branch circuits 14 and 15 to provide a return path for the current flow. The voltage vector diagram of Figure 4 may represent the vector obtained in the circuit of Figure 3 if the voltage induced in the inductances 16 and 18 are equal, in which case the vector $E_{in}$ would represent the voltage mutually induced from inductance 28 into each of the inductances 16 and 18; while the vectors $E_{16}$ and $E_{29}$ represent the self-induced voltages due to the currents flowing in the inductances 16 and 29. The voltage vector diagram of Figure 5 may be used to represent the more general case where the voltages induced into the two inductances 16 and 18 from the inductive winding 28 are not necessarily equal. The vector $E_{m16}$ represents the mutually induced voltage in the inductance 16, and likewise the vector $E_{m18}$ represents the voltage mutually induced into the inductance 18. In the vector diagram of Figure 5, the vector $E_{m18}$ has been shown as having greater length than the vector $E_{m16}$, although it will readily be seen that the reverse could easily be true. With the vectors as shown, the Q of the first branch circuit 14 need not be as high as if the vectors were as represented in Figure 4, and since $E_{m16}$ is small, the sensitivity of the bridge is quite high, with a large angle of phase shift obtainable for a small change in the relative reactances of elements 16 and 17. If the respective lengths of $E_{m16}$ and $E_{m18}$ were reversed from that shown in Figure 5, that is, with $E_{m16}$ of greater length, the Q of the second branch circuit 15 need not be as high as the aforementioned case, although a lower sensitivity and a slightly smaller degree of total phase shift would be obtainable. Another way of describing that the point O' will be at the center of the arcuate locus of the point P', is to state that the product of the circuit Q and the energizing voltage in the second branch circuit is substantially twice as great as the same product in the first branch circuit. This may be graphically illustrated by the vector diagram of Figure 4, wherein a rough approximation of the circuit Q of the second branch circuit, that is, the circuit that includes the reactances 16, 17 and 3.3, respectively, would be about 6, and the voltage $E_{in}$ would be considered as one unit of voltage. The product, therefore, of the circuit Q and the energizing voltage will then be approximately 3.3. Now in the first branch circuit, that is, the circuit including the impedances 29 and 30, the Q is approximately 1.6, with the product of $E_{in}$ and Q therefore being approximately 1.6. Thus the product of energizing voltage and Q in the second branch circuit is approximately twice the same product in the first branch circuit. In Figure 5, the Q of the second branch circuit is approximately 2.66, and with a value of $E_{m16}$ of 1, $Q \times E_{m16}$ will equal 2.66. The Q of the first branch circuit is shown as being quite low, approximately 1.1; however, the vector $E_{m18}$ is slightly larger than $E_{m16}$, or approximately 1.2 units of voltage. The product of Q and the energizing voltage in the first branch circuit then will be 1.32, or approximately half that of the same product in the second branch circuit.

Figure 6:
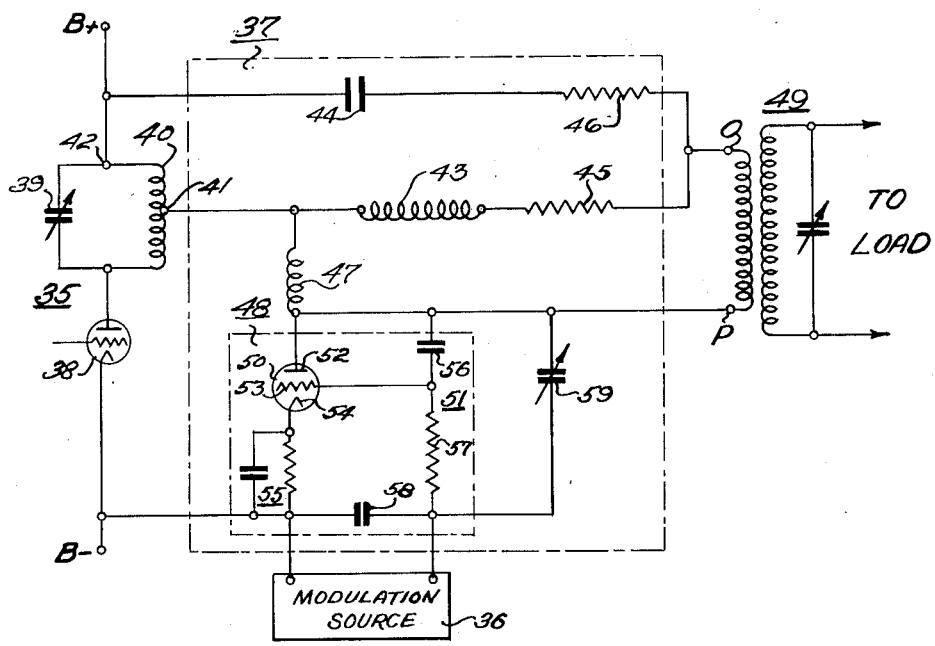
Figure 6 is a circuit diagram of a phase modulated radio transmitter incorporating a phase modulator embodying my invention.

The Figure 6 shows an embodiment of my invention as applied to a frequency or phase modulated transmitter, wherein a source of radio frequency 35 and a modulation source 36 supply their respective energies to a phase shifting bridge 37, which acts as a phase modulator to supply a phase modulated carrier wave output across its output terminals O and P to a load, which would probably be frequency multipliers and/or amplifiers. The radio frequency source 35 includes an oscillator tube 38, and a capacitive element 39 and an inductive element 40 that together form a tank circuit or parallel resonant circuit. The inductive element 40 has a tap or terminal 41, and the tank circuit 39—40 has an end terminal 42, across which terminals 41 and 42 a radio frequency voltage is developed for energizing the phase shifting bridge 37. The phase shifting bridge 37 includes a first inductive element 43, a first capacitive element 44, a second inductive element 47, and a variable capacitive element 48. The two elements 43 and 44 have resistances associated with them, numbered respectively 45 and 46. The first inductive and capacitive elements 43 and 44, with their associated resistances 45 and 46, are serially connected with the first output terminal O connected therebetween, and form a branch circuit connected across the terminals 41 and 42 of the radio frequency source 35. The second inductive element 47 and the variable capacitive element 48 are also serially connected across the terminals 41 and 42 of the radio frequency source 35, because the terminal B minus may be considered the same potential as the terminal B plus as far as radio frequency is concerned. The second output terminal P is connected at the junction of the second inductive and capacitive elements 47 and 48. An output transformer 49 is connected across the output terminals O and P, to transmit the phase modulated carrier output to the load. The variable capacitance 48 includes a thermionic tube 50 and a quadrature feedback circuit 51 to make the thermionic tube 50 exhibit the properties of a capacitive reactance. The thermionic tube 50 includes an anode 52, a control grid 53, and a cathode 54. Biasing means 55 are provided for the thermionic tube 50. The quadrature feedback circuit 51 includes a capacitance 56 connected between the anode 52 and control grid 53, and a resistance 57 connected between the control grid 53 and the cathode 54. The capacitance 56 and resistance 57 advance the phase of the voltage applied to the control grid 53 with respect to the voltage applied to the anode 52; therefore the thermionic tube 50 will exhibit the properties of a capacitance. A condenser 58 is connected in series with the resistance 57 between the control grid 53 and cathode 54, and is for the purpose of isolating these two elements with respect to the modulation frequency, while providing a low impedance bypass for radio frequencies. The modulation source 36 is connected across this condenser 58, which will have a high impedance to the modulation frequency, so that the modulation energy is applied between the cathode 54 and control grid 53. A trimmer condenser 59 is shunted across the variable capacitance 48, in order to increase the overall capacitance in this branch of the phase shifting network.

The oscillator tube 38 has been shown in symbolic form, without showing its circuit means requisite for oscillation, it being understood that this oscillator tube 38 has such circuit means for oscillation. In operation, radio frequency energy is supplied from the tank circuit 39—40 across the terminals 42 and 41, and applied to the phase shifting bridge 37. The phase shifting bridge 37 is identical to that phase shifting bridge shown in Figure 1, wherein the first branch circuit including the inductance 18 and capacitance 19 are shown in the circuit of Figure 6 as the inductance 43 and capacitance 44, with the first output terminal O connected therebetween. In the circuit of Figure 1, the second branch circuit showing the inductance 16 and capacitance 17 are shown in the circuit of Figure 6 as the inductance 47 and the capacitance 48 and 59, with the second output terminal P connected between the inductance and the capacitances. The voltage vector diagram of Figure 4 is representative of the vectors obtainable from the phase shifting bridge of Figure 1 and also the phase shifting bridge 37 of Figure 6. The modulation source 36 will vary the bias upon the thermionic tube 50, therefore varying its impedance or effective reactance, which will in turn vary the operating point of the second output terminal P on the voltage vector diagram, making it vary clockwise and then counter-clockwise as a function of the modulation energy. The phase of the output R. F. voltage across the terminals O and P will consequently be shifted with respect to the phase of the input R. F. voltage, thus producing a phase modulated R. F. voltage which is passed by the output transformer 49 to the load. If the Q of the inductance 47 and the Q of the total capacitances 48 and 59 are made fairly high, the bridge will be made very sensitive, with only a slight variation in the reactance of the variable capacitance 48 necessary to produce a large angle of phase shift. For this reason, the variable capacitance 48 need not have a large effective capacity, most of the capacity being furnished by the trimmer 59. At least a plus or minus 90 degree phase shift, and quite possibly plus or minus 120 degrees phase shift or even greater, is quite feasible with this circuit, which will obviate the necessity for as many frequency multipliers in the complete frequency modulated transmitter as was formerly necessary.

The resistances 45 and 46 associated with inductive elements 43 and capacitive element 44 may be actual resistors or they may be the inherent resistances of the elements 43 and 44. Conversely, the inductive element 47 and second capacitive element 48, while possessing inherent resistance, may have actual resistors connected either in series or in parallel therewith if it is desired to augment their inherent resistances.

Figure 7:
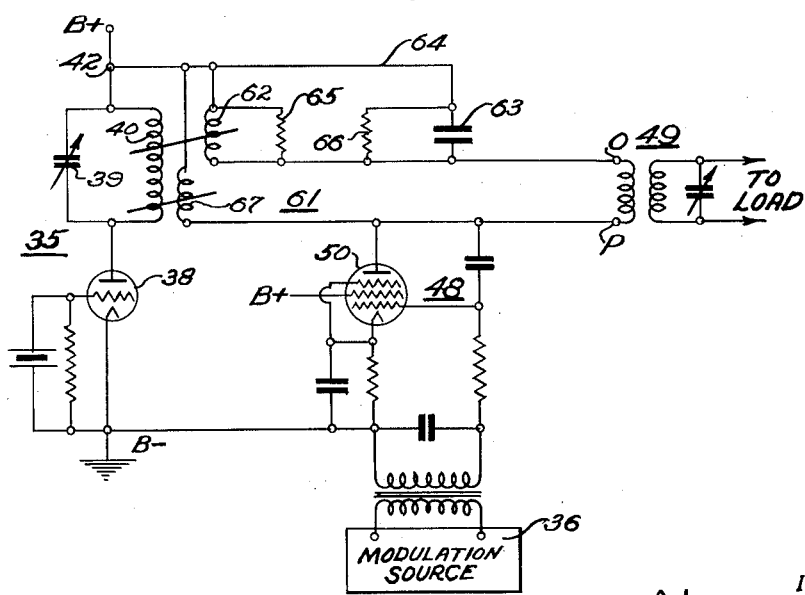
Figure 7 is a circuit diagram of another form of phase modulated radio transmitter.

Figure 7 shows another modification of a frequency or phase modulated radio transmitter embodying my invention. A radio frequency source 35, and a modulation source 36 supply a phase shifting bridge 61, wherein the phase shifting bridge 61 supplies a phase modulated carrier wave output across its terminals O and P through an output transformer 49 to a load, which would probably be frequency multipliers of the rest of the frequency modulated radio transmitter. The radio frequency source 35 includes an oscillator tube 38 and a tank circuit 39—40, comprising the capacitance 39 and an inductive winding 40. An inductive winding 62 is inductively coupled to the inductive winding 40 for receiving radio frequency energy therefrom. A capacitance 63 is serially connected to one end of the inductive winding 62 with the first output terminal O connected therebetween. The other ends of the inductance 62 and capacitance 63 are connected together by a connection means 64. Resistances 65 and 66 shunt, respectively, the inductance 62 and capacitance 63, which in combination form the first branch circuit for establishing a potential at the output terminal O. A second inductive winding 67 is also inductively coupled to the inductive winding 40 for receiving radio frequency energy therefrom. A variable capacitance 48 which includes a reactance tube 50 is serially connected with the inductance 67, with the second output terminal P connected therebetween.

In operation, the modulation source 36 again varies the impedance or effective reactance of the reactance tube 50 by varying its effective bias, and therefore varies the operating point of the output terminal P upon the arcuate locus 22 of the voltage vector diagram. The phase shifting bridge 61 is similar to the phase shifting bridge shown in the Figure 3 wherein a first branch circuit including the inductance 18 and capacitance 19 establish the first output terminal O. In the circuit of Figure 7, this first branch circuit would be the inductance 62 and capacitance 63, and their associated resistances 65 and 66. The inductance 62 and capacitance 63 are closed upon themselves by the connection means 64, which, since the input voltage is inductively applied to this first branch circuit, must be provided for a return path for the circulating current in this series resonant circuit of the first branch circuit. In the circuit of Figure 3, the connection means 27 is equivalent to the connection means 64 in the Figure 7. The voltage vector diagram of Figure 5 may be referred to for a fuller explanation of the operation of the circuit of Figure 7. The voltages induced into the two inductive windings 62 and 67 may not necessarily be of the same magnitude, which is graphically shown by the two different lengths of base line $E_{m16}$ and $E_{m18}$ in the Figure 5. The first branch circuit 62—63, establishes the point O' at, or as closely as desired to, the center of the arcuate locus 22. If a constant magnitude of output voltage is not a prime requisite of the circuit, no particular care need be taken to establish the point O' at the center of the arcuate locus 22, nor to make the locus 22 an arc of a circle, however, should this be desirable, it is easily accomplished by careful circuit design. The resistances 65 and 66 associated with the inductive element 62 and capacitive element 63 may be actual or inherent resistances, and conversely, there may be actual resistances associated with the inductive and capacitive elements 67 and 48 in addition to their inherent resistances.

Figure 8:
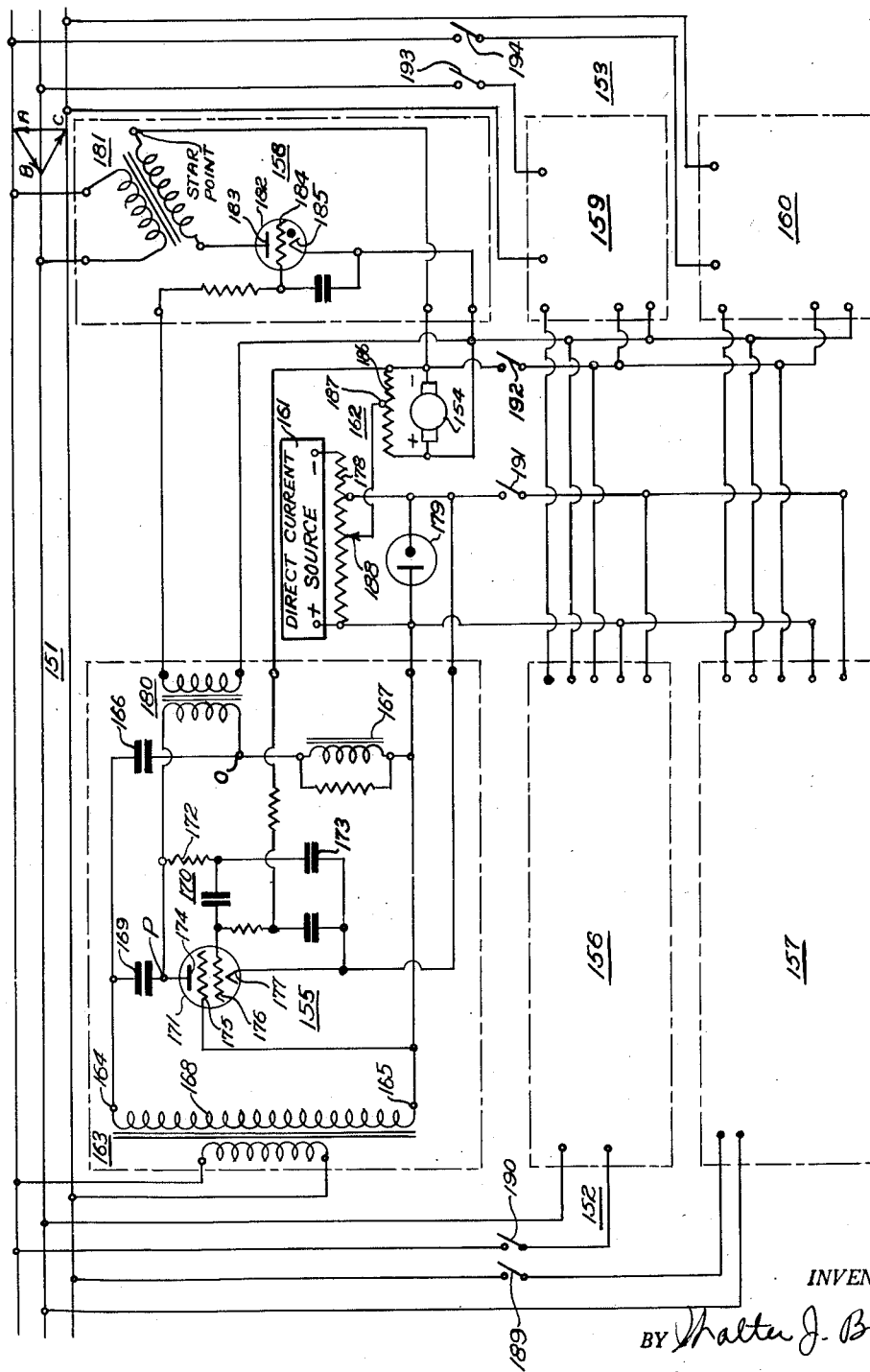
Figure 8 is a circuit diagram of a direct current motor system which includes the embodiment of my phase shifting system to control a grid controlled rectifier for the said direct current motor.

Figure 8 illustrates my phase shifting bridge as used in conjunction with a three phase power supply and a grid controlled rectifier for supplying rectified power to a direct current motor. The system includes generally, a direct current motor 154, a grid controlled rectifier system 153 for supplying rectified power to the motor 154, a phase shifting system 152 for controlling the grid controlled rectifier system 153, a direct current source 161 for supplying operating voltages to the phase shifting system 152, a control voltage supply 162 for controlling the operating conditions of the phase shifting system 152, and a three-phase supply source 151 for supplying alternating voltages to the phase shifting system 152 and to the grid controlled rectifier system 153. The phase shifting system 152 includes three phase shifters designated 155, 156 and 157 respectively. The grid controlled rectifier system 153 includes rectifiers 158, 159 and 160 respectively. The three-phase supply source 151 has three phases A, B and C, with the phase shifters 155, 156 and 157 energized respectively from the phases A, B and C. The rectifiers 158, 159 and 160 are energized respectively from phases B, C and A. It will be seen that the rectifier 158 is energized from a different phase than the phase that is energizing the phase shifter 155. This has been done purposely as a safety measure which will be discussed more fully later. The motor control system is operable with only the phase shifter 155 and the rectifier 158, omitting the phase shifters 156 and 157 and the rectifiers 159 and 160. For this reason, the latter two phase shifters and rectifiers have been shown as having switches 189 to 194, for disconnection from the supply voltages and the load, which is to illustrate that the motor control system is operative either with or without these elements as part of the motor control system. The motor control system may be fully described by describing only the phase shifter 155 and rectifier 158, which will describe the operation of only single phase power supplied to the motor 154. It will be readily apparent to those skilled in the art that such a system for one phase may be easily duplicated for a three-phase system or any polyphase system.

The phase shifter 155 is of the type of phase shifting bridge as shown in the Figure 2, and vectorially illustrated in Figure 4. An input transformer 163, which is connected across phase A, has end terminals 164 and 165 on the secondary 168 thereof. A capacitance or capacitive element 166 and an inductance or inductive element 167 are serially connected across the ends 164 and 165 of the secondary 168, with the first output terminal O of the phase shifter connected therebetween. A capacitance or capacitive element 169 and a variable inductance or inductive element 170 are serially connected across the end terminals 164 and 165 with the second output terminal P of the phase shifter connected therebetween. The variable inductance 170 includes a thermionic tube 171, and a resistance 172 and capacitance 173 forming a quadrature feedback circuit to make the thermionic tube 171 exhibit the properties of a reactance tube, or in this case specifically as an inductance. The thermionic tube 171 has a plate 174, a screen grid 175, a control grid 176, and a cathode 177. Biasing and high voltage supplies are supplied to the tube 171 by a voltage divider 178 connected across the terminals of the direct current source 161. Positive direct current potentials are applied to the screen 175 and plate 174, and a negative potential is applied to the cathode 177. A voltage regulator tube 179 is connected across the plate and screen supply voltages. The operation of the phase shifter 155 is similar in operation to the operation of the circuit of Figure 2, wherein the potential of the output terminal P is variable throughout an arcuate locus by varying the variable inductance 170.

The rectifier 158 is illustrative of connection to one leg 181 of a delta-star connected three-phase transformer. The secondary of the leg 181 has a rectifier tube 182 and the motor 154 serially connected across it. The rectifier tube 182 has a plate 183, a control grid 184 and a cathode 185. The output of the rectifier tube 182 is supplied to the motor 154 by the aforementioned series connection. The output of the phase shifter 155 is supplied through an output transformer 180 to the grid 184 with respect to the cathode 185 of the rectifier tube 182. The star point, illustrated at one end of the secondary of the transformer leg 181, would be the star point or common point of the secondary of the three-phase transformer, if a three-phase rectifier system were used.

The control voltage supply 162 includes a shunt resistance 186 connected across the motor 154. The shunt resistance 186 has a tap connection 187 for supplying a direct current feedback voltage to the phase shifter 155 through a movable contact 188 on the voltage divider 178. The direct current feedback voltage obtained from the shunt resistance 186 supplies a negative voltage to the grid 176 of the tube 171, whereas the voltage divider 178 supplies either a negative or a positive voltage to control the amount of bias applied to the tube 171. The amount of bias supplied to the tube 171 determines the effective reactance of this tube, and consequently the operation position of the output terminal P on the arcuate locus of the voltage vector diagram.

In operation, the three-phase supply source 151 supplies an alternating voltage of fixed magnitude and phase relationship to both the rectifier 158 and the phase shifter 155. The phase shifter 155, being responsive to the control voltage supply 162, controls the rectifier 158 by supplying a phase shifted voltage from its output terminals O and P. The voltage vector diagram of Figure 4 represents the voltage vectors obtainable from the phase shifter 155, wherein the variable inductance 170, which is a reactance tube, varies the potential at the output terminal P about an arcuate locus, with the point O at the center thereof. The setting of the movable contact 188 governs the ultimate speed of the motor 154. The combination of the direct current feedback from the shunt resistor 186 and the voltage obtained from the voltage divider 178, determines the bias applied to the tube 171. This bias determines the effective reactance of the tube 171, and consequently the operating point on the arcuate locus of the voltage vector diagram. When there is a large negative bias, the tube 171 has a high impedance or high effective reactance, and the position of the point P' will be at its farthermost clockwise position. In this position, the voltage vector O'P' on the vector diagram of Figure 4 is about 60 degrees lagging of a zero reference base line. The input voltage 165—164 obtained across the secondary of the input transformer 163 will be considered as the reference voltage having a zero phase according to standard electrical practice, or in other words the vector of the voltage 165—164 will be horizontal to the right. This vector represents the phase A, and, as will be seen at the upper right of the Figure 8, the vector representation is such that the phase B leads the phase A by 120 degrees. This means that the phase of the voltage applied to the rectifier 158 is 120 degrees leading with respect to the phase of the voltage supplying the phase shifter 155. Under a condition of high bias, with high effective reactance of the inductance 170, the vector O—P will be 60 degrees lagging the reference voltage 165—164, and the voltage applied across the plate 183 and cathode 185 of the rectifier tube 182 is 120 degrees leading this reference voltage. Therefore, it will be seen that the voltage applied to the grid 184 will then be 180 degrees lagging the plate-cathode voltage. Under this condition, the tube will not fire during any portion of the cycle. This is the measure of safety which was recited earlier, in that should the tube 171 fail for any reason, which means it would have a theoretically infinite impedance, the phase of the voltage across the terminals O and P of this phase shifter 155 would then be such as to cause the rectifier 158 to be turned off. This measure of safety is quite important to prevent the motor from going to a high or full speed from its former predetermined speed setting upon the failure of the reactance tube. Care must be taken in the circuit design to prevent more than 180 degress lagging current, or this will cause this rectifier tube to turn full on, with full excitation supplied to the motor 154. A fixed phase-shifting network may be supplied in the circuit in such a manner to prevent such an occurrence, and I have found that the output transformer 180 and the resistance-capacity filters in the grid circuits of the rectifier tubes cause a slight shift in phase in a lagging direction which also must be taken into account in the design of the circuit.

When there is a low negative bias condition applied to the tube 171, the impedance or effective reactance of this tube 171 is low, thereby shifting the operating point of the output terminal P in a counter-clockwise direction. The point P' on the voltage vector diagram may easily be shifted counter-clockwise sufficiently to permit the output voltage across the terminals O and P to be directly in phase with the voltage applied to the plate and cathode of the rectifier tube 182. This allows the rectifier tube 182 to have a full output. The control voltage supply 162 obtains a voltage that is proportional to speed from the shunt resistor 186. As the speed of the motor 154 increases, a greater voltage is obtained across the shunt resistor 186, thereby applying a more negative voltage to the grid 176 of the thermionic tube 171, which increases its effective reactance and thereby causes the output voltage O—P to be more lagging to reduce the output of the rectifier 158 and consequently lower the speed of the motor 154. Thus a balance is always maintained between the voltage taken from the motor armature and the voltage applied from the biasing voltage divider 178. Thereby the motor voltage is held substantially constant at a value depending upon the setting of the voltage divider 178.

The operation of the phase shifter 155 and rectifier 158 are complete as they have been described as being excited from different phases of a three-phase supply. As mentioned above, other phase shifters 156 and 157 may be employed in conjunction with other rectifiers 159 and 160, by closing the switches 189, 190, 193 and 194. Switch means 191 are shown for connecting the direct current source 161 and the control voltage supply 162 to the phase shifters 156 and 157, and switch means 192 are also shown for connecting the output of the rectifiers 159 and 160 to the motor 154.

Alternately, when only a single phase supply is available, the phase shifter 155 may be energized from the same phase as the rectifier 158 through a fixed phase shifting network which will displace the output voltage of the phase shifter so that the grid voltage of the rectifier can never lag by more than 180° behind the voltage applied to the plate of the rectifier.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination with an alternating voltage source, the provision of a phase shifting bridge having first and second output terminals, said bridge comprising first and second branch circuits adapted to be energized from said alternating voltage source, each of said branch circuits having a capacitive arm and an inductive arm serially connected with said correspondingly numbered output terminal connected therebetween, said second branch circuit having substantially twice the Q as the Q of the said first branch circuit, and means for varying the relative impedance of the arms of said second branch circuit whereby the phase of the output voltage may be varied with respect to the source voltage.

2. In combination with an alternating voltage source, the provision of a phase shifting bridge having first and second output terminals, said bridge comprising first and second branch circuits adapted to be energized from said alternating voltage source, each of said branch circuits having a capacitive arm and an inductive arm serially connected with said correspondingly numbered output terminal connected therebetween, said second branch circuit having substantially twice the Q as the Q of the said first branch circuit, and means for varying the relative impedance of the arms of said second branch circuit while maintaining a substantially constant Q therein whereby the phase of the output voltage may be varied more than 180 degrees with respect to the source voltage while maintaining a substantially constant magnitude.

3. In combination with an alternating voltage source, the provision of a phase shifting bridge having first and second output terminals, said bridge comprising first and second branch circuits adapted to be energized from said alternating voltage source, each of said branch circuits having a capacitive element and an inductive element serially connected with said correspondingly numbered output terminal connected therebetween, resistance associated with each of said elements, the resistance associated with each element in said first branch circuit being substantially equal, the reactance of said inductance element and said capacitance element in said first branch circuit being maintained substantially in equality, said second branch circuit having substantially twice the Q as said first branch circuit, and means for varying the relative impedance of the elements of said second branch circuit while maintaining a substantially constant Q therein.

4. In combination with an alternating voltage source, the provision of a phase shifting bridge having first and second output terminals, said bridge comprising first and second branch circuits, means for energizing each of said branch circuits from said alternating voltage source, each of said branch circuits having a capacitive arm and an inductive arm serially connected with said correspondingly numbered output terminal connected therebetween, the product of the circuit Q and the energizing voltage in said second branch circuit being substantially twice as great as the same product in said first branch circuit, and means for varying the relative impedance of the arms in said second branch circuit.

5. In combination with an alternating voltage source, the provision of a phase shifting bridge having first and second output terminals, said bridge comprising first and second branch circuits, each of said branch circuits having a capacitive element and an inductive element serially connected with said correspondingly numbered output terminal connected therebetween, means for inductively energizing at least one of said inductive elements from said alternating voltage source, resistance associated with each of said elements, said second branch circuit having substantially twice the Q as said first branch circuit, the impedance of said elements in said first branch circuit being maintained substantially in equality, and means for varying the relative reactance of the elements of said second branch circuit while maintaining a substantially constant Q therein.

6. In combination with an alternating voltage source, the provision of a phase shifting bridge having first and second output terminals, said bridge comprising first and second branch circuits, each of said branch circuits having a capacitive element and an inductive element serially connected with said correspondingly numbered output terminal connected therebetween, means for inductively energizing each inductive element from said alternating voltage source, resistance associated with each of said elements, said second branch circuit having substantially twice the Q as said first branch circuit, the impedance of said elements in said first branch circuit being maintained substantially in equality, and means for varying the relative reactance of the elements of said second branch circuit while maintaining a substantially constant Q therein.

7. In combination with an alternating voltage source, the provision of a phase shifting bridge having first and second output terminals, said bridge comprising first and second branch circuits, means to energize said branch circuits from said alternating voltage source, each of said branch circuits having a capacitive element and an inductive element serially connected with said correspondingly designated output terminal connected therebetween, each of said elements in said second branch circuit having inherent resistance therein, resistance associated with each element in said first branch circuit, said second branch circuit having substantially twice the Q as said first branch circuit, the impedance of said elements in said first branch circuit being maintained substantially in equality, and means for varying the relative impedance of the elements in said second branch circuit.

8. In combination with an alternating voltage source, the provision of a phase shifting bridge having first and second output terminals, said bridge comprising first and second branch circuits, means to energize said branch circuits from said alternating voltage source, each of said branch circuits having a capacitive element and an inductive element serially connected with said correspondingly designated output terminal connected therebetween, each of said elements having inherent resistance therein, said second branch circuit having substantially twice the Q of said first branch circuit, the impedance of said elements in said first branch circuit being maintained substantially in equality, and means for varying the relative reactance of the elements in said second branch circuit while maintaining a substantially constant Q therein.

9. In combination with an alternating voltage source, the provision of a phase shifting bridge having first and second output terminals, said bridge comprising first and second branch circuits, means to energize said branch circuits from said alternating voltage source, each of said branch circuits having a capacitive element and an inductive element serially connected with said correspondingly designated output terminal connected therebetween, resistance means in series with each element in said first branch circuit, said second branch circuit having substantially twice the Q of said first branch circuit, and means for varying the relative reactance of the elements in said second branch circuit while maintaining a substantially constant Q therein.

10. In combination with an alternating voltage source, the provision of a phase shifting bridge having first and second output terminals, said bridge comprising first and second branch circuits, means to energize said branch circuits from said alternating voltage source, each of said branch circuits having a capacitance element and an inductance element serially connected with said correspondingly designated output terminal connected therebetween, resistance means in parallel with each element in said first branch circuit, said second branch circuit having substantially twice the Q as said first branch circuit, the impedance of said elements in said first branch circuit being maintained substantially in equality, and means for varying the relative reactance of the elements in said second branch circuit while maintaining a substantially constant Q therein.

11. In combination with an alternating voltage source, the provision of a phase shifting bridge having first and second output terminals, said bridge comprising first and second branch circuits adapted to be energized from said alternating voltage source, each of said branch circuits having a first and second reactance arm of opposite sign serially connected with said correspondingly designated output terminal connected therebetween, said second branch circuit having appreciably greater Q than said first branch circuit, and means for varying the relative impedance of the arms of said second branch circuit whereby the phase of the output voltage may be varied more than 180 degrees with respect to the source voltage.

12. In combination with an alternating voltage source, the provision of a phase shifting bridge having first and second output terminals, said bridge comprising first and second branch circuits adapted to be energized from said alternating voltage source, each of said branch circuits having a capacitive arm and an inductive arm serially connected with said correspondingly numbered output terminal connected therebetween, the impedance of said arms in said first branch circuit being substantially equal, the product of the circuit Q and the energizing voltage in said second branch circuit being substantially twice as great as the same product in said first branch circuit, and means for varying the relative reactance of the arms in said second branch circuit while maintaining a substantially constant Q therein.

13. In combination with an alternating voltage source, the provision of a phase shifting bridge having first and second output terminals, said bridge comprising first and second branch circuits, each of said branch circuits having a capacitive arm and an inductive arm serially connected with said correspondingly numbered output terminal connected therebetween, means for energizing both branches from a reference voltage, and means for varying the relative reactance of the arms in said second branch circuit for causing the potential at the second output terminal to describe, on a voltage vector diagram, a locus which lies upon a substantially circular arc spanning the reference voltage vector, said arms of said first branch circuit establishing the potential at said first output terminal substantially at the center of said arc.

14. In combination with an alternating current source, the provision of a phase shifting bridge having first and second output terminals, said bridge comprising first and second branch circuits, each of said branch circuits having a capacitive arm and an inductive arm serially connected with said correspondingly numbered output terminal connected therebetween, means for energizing said first and second branch circuits respectively with first and second reference voltages derived from the alternating current source, and means for varying the relative reactance of the arms in said second branch circuit for causing the potential at the second output terminal to describe, on a voltage vector diagram, a locus which lies upon a substantially circular arc spanning the second reference voltage vector, said arms of said first branch circuit establishing the potential at said first output terminal substantially at the center of said arc.

15. In combination with a periodic voltage source, the provision of a phase shifting bridge having first and second output terminals, said bridge comprising first and second branch circuits, each of said branch circuits having a capacitive arm and an inductive arm serially connected with said correspondingly numbered output terminal connected therebetween, means for energizing both branches from a reference voltage having a determinable relationship with said periodic voltage source, and means for varying the relative impedance of the arms in said second branch circuit for causing the potential at the second output terminal to describe, on a voltage vector diagram, a locus which lies upon an arc spanning the reference voltage vector, said arms of said first branch circuit establishing the potential at said first output terminal within the space bounded by said arc and said reference voltage.

16. In combination with a periodic current source, the provision of a phase shifting bridge having first and second output terminals, said bridge comprising first and second branch circuits, each of said branch circuits having a capacitive arm and an inductive arm serially connected with said correspondingly numbered output terminal connected therebetween, means for energizing said first and second branch circuits respectively with first and second reference voltages derived from the periodic current source, and means for varying the relative impedance of the arms in said second branch circuit for causing the potential at the second output terminal to describe, on a voltage vector diagram, a locus which lies upon an arc spanning the second reference voltage vector, said arms of said first branch circuit establishing the potential at said first output terminal within the space bounded by said arc and said second reference voltage.

17. In combination with an alternating voltage source, the provision of a phase shifting bridge having first and second output terminals, said bridge comprising first and second branch circuits, each of said branch circuits having a capacitive element and an inductive element serially connected with said correspondingly numbered output terminal connected therebetween, means for inductively energizing at least one of said inductive elements from said alternating voltage source, resistance associated with each of said elements in said first branch circuit, said second branch circuit having substantially twice the Q as said first branch circuit, and means for varying the relative impedance of the elements of said second branch circuit.

WALTER J. BROWN.

REFERENCES CITED

The following references are of record in the file of this patent:

UNITED STATES PATENTS

| Number | Name | Date |
|---|---|---|
| 1,717,400 | Nyquist | June 18, 1929 |
| 1,900,538 | Bedford | Mar. 7, 1933 |
| 1,921,788 | Suits | Aug. 8, 1933 |
| 2,032,176 | Kavalsky | Feb. 25, 1936 |
| 2,158,871 | Jacobsen | May 16, 1939 |
| 2,160,528 | Usselman | May 30, 1939 |
| 2,228,869 | Chireix | Jan. 14, 1941 |
| 2,229,448 | Garman | Jan. 21, 1941 |